SINGLE ENDED TO DOUBLE ENDED TO SINGLE ENDED
COMMUNICATION SYSTEM
Filed Jan. 10, 1963
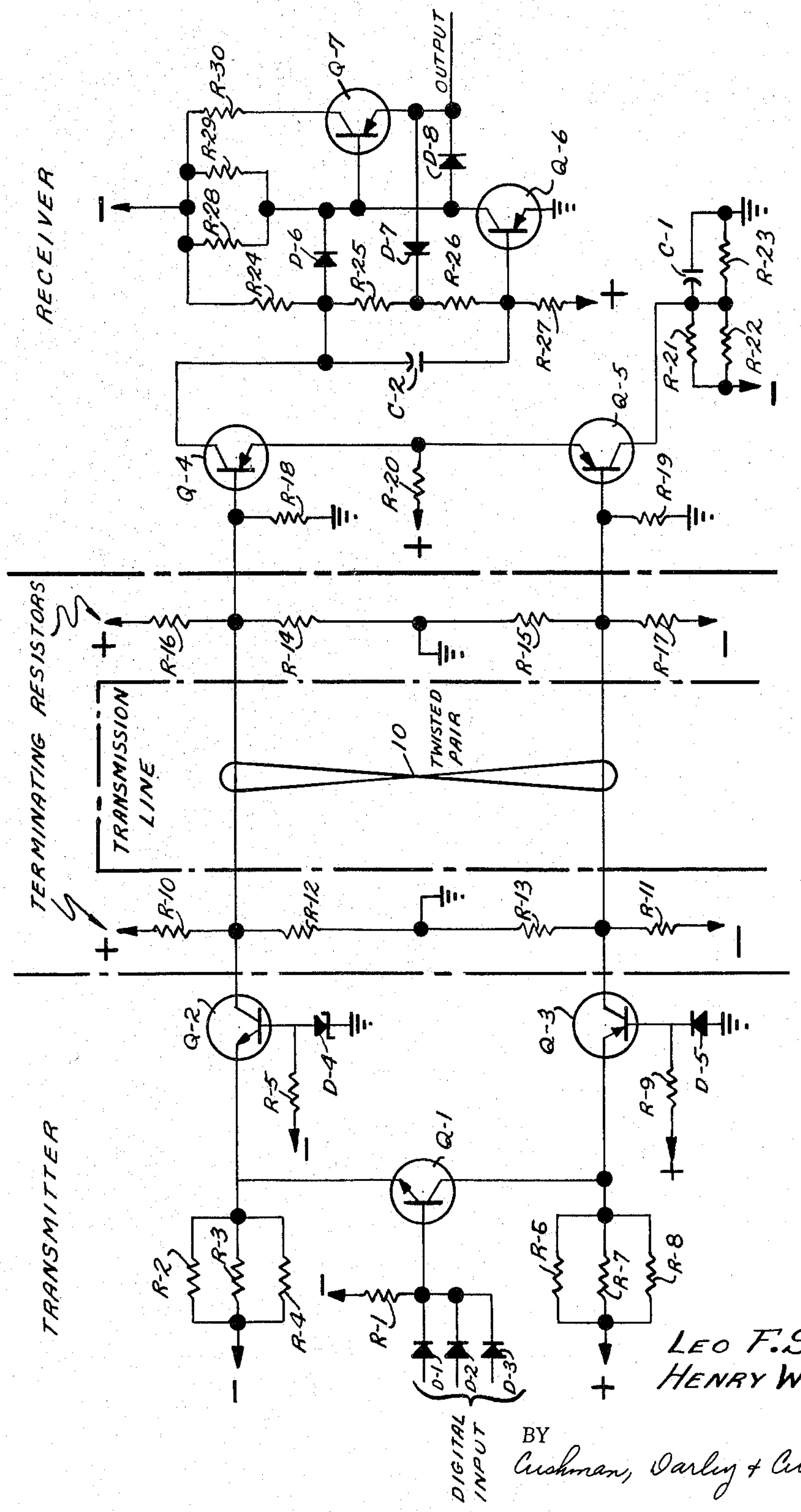
INVENTORS
LEO F. SLATTERY
HENRY W. SCHOENHERR
BY
Cushman, Darby & Cushman
ATTORNEYS United States Patent Office 3,290,653
Patented Dec. 6, 1966

3,290,653

SINGLE ENDED TO DOUBLE ENDED TO SINGLE ENDED COMMUNICATION SYSTEM

Leo F. Slattery, St. Paul, and Henry W. Schoenherr, Minneapolis, Minn., assignors to Control Data Corporation, Minneapolis, Minn., a corporation of Minnesota Filed Jan. 10, 1963, Ser. No. 250,692
9 Claims. (Cl. 340—147)

This invention relates to a communication system for transferring digital information and in particular to a transmitter and receiver arrangement which may be utilized to interconnect portions of a digital computer.

In large high-speed computing apparatus, the operating equipment includes a number of sections or modules which are interconnected to form the entire computation unit. For successful operation of the computer, it is necessary to transfer logical information rapidly from one module to another within the computer.

The present invention provides a transmitting-receiving arrangement for high speed transfer of digital information from one module to another.

Another object is to provide a high speed communication in which the transmitted digital information may be detected by utilizing the polarity of a differential signal.

A further object is the use of low voltage values for the differential signal generated at the transmitter and detected at the receiver.

These and other objects and the entire scope of the invention will become more fully apparent from the following detailed description of an illustrative embodiment and from the appended claims. The illustrative embodiment may best be understood by reference to the accompanying drawing which is a schematic diagram of a transmitter and receiver connected by an appropriate transmission line and constituting an embodiment of the illustrative invention.

Before presenting the detailed description of the preferred embodiment of the invention, a brief summary of the operation of the arrangement will be described. The transmitter acts as a switching device to selectively drive current through a biased network line, in the form of a twisted pair, to the receiver. With the transmitter disabled due to the presence of a logical "0" at its input, no current from the transmitter is supplied to the transmission line. The biasing of the line under this condition results in current flow therethrough which produces a differential signal of a particular polarity across the transmitting line. With a logical "1" supplied as an input, the transmitter is enabled to drive current through the transmission line. The circuit parameters are such that this current produces a differential signal across the line equal in magnitude, but opposite in direction, to that produced when the transmitter was disabled. The receiver responds to the polarity of the differential signal to produce an output corresponding to the transmitter input.

Referring to the drawing, the transmitter comprises an AND gate consisting of diodes D–1, D–2 and D–3 having a common cathode connected to a negative voltage source through resistor R–1. The common cathode point is also connected to the base of a NPN type transistor Q–1. The emitter of transistor Q–1 is connected to a negative source through resistors R–2, R–3 and R–4, these connected in parallel. The collector of Q–1 is joined to a positive source through resistors R–6, R–7, and R–8, these connected in parallel. The emitter of Q–1 is also directly connected with the emitter of NPN type transistor Q–2, and the collector of Q–1 is directly joined to the emitter of a PNP type transistor Q–3. The base of transistor Q–2 is connected through a zener diode D–4 to ground. Transistor Q–3 has its base similarly connected to ground through zener diode D–5, and a positive voltage source is applied to its base through resistor R–9.

The collectors of transistors Q–2 and Q3 are connected to the transmitter ends of a twisted pair transmission line 10. The collector of Q–2 and one transmitter end of the twisted pair comprise a common junction with a biasing line connected through a resistor R–10 to a positive source. The other transmitter end of the twisted pair forms a common junction with the collector of Q–3 and a biasing line from a negative source through resistor R–11. The transmission line 10 is of the non reflective type and is terminated at its ends by its characteristic surge impedance. In the illustrative embodiment, this comprises resistors R–12 and R–13 at the transmitter end connected in series across the line between the common junction points just described. This series combination is preferably center-tapped to ground. At the receiver end of the transmission line, there is connected across the twisted pair ends a characteristic surge impedance comprising resistors R–14 and R–15 in series, this series combination also preferably being center-tapped to ground. One receiver end of line 10 is biased by a positive source connected through a resistor R–16 to the junction between the resistor R–14 and the receiver end of line 10, and the other receiver end is biased by a negative source connected through resistor R–17 to this end.

The receiver section of the system includes a pair of PNP type transistors Q–4 and Q–5. The common junction point of resistors R–14 and R–16 and one receiver end of the twisted pair line 10 is joined to the base of Q–4. This base is also connected through a resistor R–18 to ground. Similarly, the common junction of resistors R–15 and R–17 and the other receiver end of twisted pair 10 is joined to the base of Q–5, this base also being connected to ground through a resistor R–19. The transistors Q–4 and Q–5 are connected in a common emitter arrangement, the emitters being connected to a positive source through resistor R–20. The collector Q–5 is connected through a pair of parallel resistors R–21 and R–22 to a negative source. A condenser C–1 and a resistor R–23 are also connected in parallel between the collector of Q–5 and ground. The collector of transistor Q–4 is connected to a negative supply through a resistor R–24. This collector is also coupled to the base of a PNP transistor Q–6 by means of condenser C–2. In parallel with C–2 is a series circuit comprising resistors R–25 and R–26. The base of Q–6 is joined to a positive source through resistor R–27 and the emitter of this transistor is grounded. The collector of Q–6 is connected to a negative source through parallel resistors R–28 and R–29. The collectors of Q–4 and Q–6 are joined by a diode D–6, the anode of D–6 being connected to Q–4. The collector of Q–6 is also connected to the base of PNP transistor Q–7, the collector of which is connected through resistor R–30 to a negative voltage source. The output of the receiver is taken at the emitter of Q–7. A diode D–7 is connected from the emitter of Q–7 to the junction point of resistors R–25 and R–26, the cathode of D–7 being joined to this junction point. A diode D–8 is connected between the collector of transistor Q–6 and the emitter of Q–7, the anode of D–8 being attached to the collector of Q–6.

To aid in the explanation of the operation of the invention, an exemplary selection of circuit parameters is hereinafter set forth. It is to be understood that these values are employed for the purpose of illustration only and should in no way be considered as a limitation of the system:

| | |
|---|---|
| R–1 | 8.2K |
| R–2, R–3, R–4 | 2.4K |
| R–5 | 10K |
| R–6, R–7, R–8 | 2.4K |
| R–9 | 10K |
| R–10, R–11 | 3.9K |
| R–12, R–13, R–14, R–15 | 56Ω |
| R–16, R–17 | 3.9K |
| R–18, R–19 | 10K |
| R–20 | 4.7K |
| R–21 | 2.2K |
| R–22 | 2.7K |
| R–23 | 800Ω |
| R–24 | 3.9K |
| R–25 | 2.4K |
| R–26 | 820Ω |
| R–27 | 15K |
| R–28, R–29 | 3.9K |
| R–30 | 470Ω |
| D–4, D–5 | 3 volt breakdown |
| C–1, C–2 | 100 μμf. |

All positive sources are +20 volts.
All negative sources are −20 volts.
The characteristic surge impedance of the twisted pair transmission line is approximately 100–120Ω.
Inputs to the transmitter are logical "1's" and "0's" of −5.8 volts and −1.1 volts respectively.

In the transmitter set forth in the preferred embodiment the logical input circuitry comprises a 3-way AND gate, the inputs being applied to the anodes of D–1, D–2 and D–3. A logical "1" being passed through the AND gate as a single-ended input to the base of transistor Q–1 turns this transistor off, whereas an "0" at the gate output allows Q–1 to conduct. This switching action serves, as hereinafter described, to selectively shunt transistors Q–2 and Q–3.

With Q–1 turned on, the current flow in the transmitter portion of the system is between positive and negative sources through the series path comprising the parallel resistor combination R–2–R–4, transistor Q–1 and the parallel resistor arrangement of R–6–R–8. Under these conditions, the only voltages applied to the transmission line are the biasing voltages thereof . These produce approximately a 5 milliamp current flow in one direction through the terminating resistors R–12–R–15. Accordingly, a differential voltage of approximately 0.5 volt appears across the twisted pair ends. This voltage is of a first polarity. However, when transistor Q–1 is turned off by the application of a logical "1" to the base thereof, a shunt path for transistors Q–2 and Q–3 no longer exists. The transmitter biasing voltages cause Q–2 and Q–3 to conduct and they thereby become current generators of opposite polarities. Q–3 injects a current of approximately 20 milliamps into the line and a like amount of current flows out of the line into Q–2. This turning on of the transmitter by switching off Q–1 causes this 20 milliamp current to divide into two 10 milliamp currents which flow through each line termination branch. This current is in the opposite direction to the 5 milliamp transmission line current caused by its biasing. Thus, the new current flow is 5 milliamps in the opposite direction, producing a voltage drop equal in magnitude and opposite in direction to the original voltage across the line. This differential voltage across the twisted pair ends therefore may be utilized to represent the logical "1's" and "0's" present at the input to the transmitter, the transmitter converting the logical single-ended input to a double-ended output having equal magnitude but polarity differing as a function of whether the single-ended logical input is a "1" or a "0."

The base networks of transistors Q–2 and Q–3 each contain a 3-volt zener diode which performs two functions. In the first case, the zener diode sets the voltage level at which the emitters of Q–2 and Q–3 will reach their turned-on state. This, in turn, sets the threshold that must be overcome at the base of Q–1, since its emitter is set at the same potential as the emitter of Q–2. In the second case, the zener diodes set the base voltages of Q–2 and Q–3 which determine how much noise voltage will be allowed at the collectors before the collector base junctions become forward biased. In the example used, this value of noise voltage is something over 3 volts since the forward drop of the collector base junctions adds to the zener diode voltage. This means that the transmitter will operate satisfactorily with up to 3 volts of random noise on the transmission line.

As has been stated previously, the characteristic surge impedance of the transmission line 10 is 100–120 ohms. By terminating the line at each end with a 112 ohm resistive load comprising two 56 ohm resistors in series with an optional center ground reference, good impedance matching is achieved minimizing reflections and standing waves.

The receiver functions as both a differential amplifier and a discriminator. It provides a logic output of either "1" or "0" according to the polarity of the differential 0.5 volt signal which the two input terminals receive from the transmission line.

The receiver ends of the twisted pair transmission line are connected directly to the bases of transistors Q–4 and Q–5. The 0.5 volt differential signal across the ends of the line is centered about ground, so that one input shifts approximately 0.25 volt positive while the other input shifts negative a similar amount. Since the transistors Q–4 and Q–5 are of the PNP type, the one receiving the negative input will conduct more heavily than the other.

The circuit is such that a negative input to the base of Q–5 results in a logical "1" at the receiver output. Under the opposite conditions of a positive input to Q–4 and a negative input to Q–5, the output is a logical "0."

Assuming the latter input conditions on the inputs of Q–4 and Q–5, current flows more heavily in Q–5. Transistor Q–6 is biased to conduct allowing current to flow through diode D–8 to produce a logical "0" output. This voltage at the output insures that the base-emitter junction of transistor Q–7 is back biased thereby preventing this stage from conducting. The transistor Q–6 is clamped out of saturation by diode D–7 so that the "0" output settles at −1.1 volts.

When a logical "1" is applied as an input to Q–4, its conduction increases causing its collector to become more positive. This allows transistor Q–4 to apply approximately 5 milliamps of collector current to the junction of R–24, R–25 and the anode of diode D–6. As a result, transistor Q–6 is cut-off and this allows Q–7 to conduct since its base-emitter junction is no longer back-biased by diode D–8, the latter now being back-biased due to the negative-going voltage which occurs on the collector of Q–6 as it cuts off. The conduction of Q–7 causes the output voltage to be driven more negative until it reaches a point where it is clamped at −5.8 volts by diode D–6. Thus, a logical "1" on the input to the receiver results in a logical "1" at its output.

Various modifications of the system may be made within the spirit of the invention. For example, a logical inversion between the input to the transmitter and the output from the receiver may be achieved by reversing the connections at the receiver inputs. Other examples of modifications possible are the biasing of the transmission line at one end only or in the center of the line. Such modifications would necessitate a change in the bias resistor sizes. However, these modifications are among those contemplated by the invention.

In utilizing this invention with the exemplary circuit parameters listed above, a length of transmission line up to 200 feet has been employed allowing up to 20 transmitters and 20 receivers to be placed in parallel anywhere along the line. Inactive transmitters and receivers do not load a transmission line and do not have to be disconnected from it. With such a system, bit rates of 8 mc. or greater are possible, and a receiver may drive 8 OR loads, 8 AND loads, or any combination resulting in 8 loads total.

The communication system disclosed herein is an example of an arrangement in which the inventive features of this disclosure may be utilized, and it will be readily apparent to one skilled in the art that certain modifications may be made within the spirit of the invention as defined by the appended claims.

What is claimed is:

1. A communication system for transferring digital information from one location to another comprising a source of single-ended digital information, a transmitter connected to said source for converting said single-ended digital information to a double-ended signal and for transmitting said double-ended signal, transmission means over which said double-ended signal is transmitted, and receiver means for receiving said transmitted double-ended signal and for utilizing the polarity of said double-ended signal with respect to a reference level to reconvert said signal to a single-ended signal representative of the digital information.

2. A communication system for transferring digital information from one location to another comprising a source of single-ended digital information, means for converting said single-ended information to a double-ended signal, means for transmitting said double-ended signal, and means responsive to the polarity of said double-ended signal with respect to a reference level for reconverting said double-ended signal to a single-ended signal representative of the digital information.

3. A communication system for transferring digital information from one location to another comprising a source of single-ended digital information, a transmitter connected to said source, said transmitter having a single-ended input to which said source is connected and a double-ended output, a now reflective transmission line joined at any point along its length to said transmitter double-ended output, and a receiver having a double-ended input and a single-ended output, said receiver double-ended input being connected to any point along said transmission line.

4. A communication system as set forth in claim 3 wherein said transmission line comprises a twisted pair terminated at each of its ends by its characteristic impedance.

5. A communication system as set forth in claim 3 wherein said transmission line is continuously biased.

6. A communication system for transferring digital information from one location to another comprising a source of single-ended digital information to be transmitted, transmitter means connected to said source, said transmitter having a single-ended input and a double-ended output, a continuously biased transmission line connected to said transmitter double-ended output, current generator means in said transmitter to drive current through said transmission line in a direction opposite to current produced in said transmission line due to its biasing, means in said transmitter to interrupt current flow from said current generator means to said transmission line, and receiver means responsive to the change in voltage polarity on said transmission line caused by said interruptions to reproduce the digital information transmitted in its original form.

7. A communication system as set forth in claim 6 wherein said transmission line comprises a twisted pair terminated at each of its ends by its characteristic impedance.

8. A communication system as set forth in claim 6 wherein said current flow interruption means comprises a transistor switch responsive to said single-ended digital information to be transmitted to shunt said current generators.

9. A communication system as set forth in claim 6 wherein said receiver means comprises a differential amplifier and a discriminator.

References Cited by the Examiner

UNITED STATES PATENTS

| | | | |
|---|---|---|---|
| 2,013,154 | 9/1935 | Jensen | 333—25 |
| 2,380,389 | 7/1945 | Andrews | 333—25 X |
| 2,393,709 | 1/1946 | Romander | 330—120 X |
| 2,540,817 | 2/1951 | Forster | 333—25 X |
| 3,114,120 | 12/1963 | Heck | 333—25 X |

NEIL C. READ, *Primary Examiner.*

H. I. PITTS, *Assistant Examiner.*